United States Patent [19]

Sherer

[11] 4,016,599
[45] Apr. 5, 1977

[54] ANTI-SHOULDERING READ CIRCUIT FOR MAGNETIC DISK MEMORY

[75] Inventor: Paul Sherer, Costa Mesa, Calif.
[73] Assignee: Xerox Corporation, Stamford, Conn.
[22] Filed: Mar. 19, 1976
[21] Appl. No.: 668,367
[52] U.S. Cl. .................................................. 360/53
[51] Int. Cl.² .......................................... G11B 5/09
[58] Field of Search ........................ 360/41, 42, 53

[56] References Cited
UNITED STATES PATENTS

| | | | |
|---|---|---|---|
| 3,840,892 | 10/1974 | Hayashi | 360/41 |
| 3,947,876 | 3/1976 | Gray | 360/41 |

*Primary Examiner*—Vincent P. Canney
*Attorney, Agent, or Firm*—James J. Ralabate; Michael J. Colitz, Jr.; Franklyn C. Weiss

[57] ABSTRACT

During the reading of certain combinations of bits from a magnetic disk memory surface, wider than normal separations may occur between positive and negative peaks. In order to eliminate false peak readings to be decoded by the decoding circuitry, a delayed readback signal is compared with the undelayed signal in a pair of polarity discriminators. The delayed signal is also differentiated to provide a complementary output. Zero crossing detectors are connected to receive the complementary outputs and are gated by the polarity discriminators. The output of the detectors is connected to a latch circuit which sets and resets according to zero crossing detections. An output circuit develops a peak indicating pulse whenever the latch changes state, which is utilized by subsequent circuitry to generate the decoded digital signal.

10 Claims, 3 Drawing Figures

ANTI-SHOULDERING READ CIRCUIT FOR MAGNETIC DISK MEMORY

BACKGROUND OF THE INVENTION

In rotating magnetic disk memories, the recording density (bits or magnetic flux reversals per distance on a track) is limited by the inside track since it has the least circumference. Data bits are retrieved by detecting the time at which an induced peak is sensed by a read head in relation to preceding peaks. The time position of peaks is the most stable parameter under conditions of various data patterns, and is, therefore, used in preference to amplitude which varies greatly. A widely employed technique to detect the location of a peak is to take the derivative of the amplified signal. When a peak occurs, the slope will change sign and go through zero. The derivative is obtained by an electronic differentiator and when its output goes to zero, an indication of the presence of a peak can be generated. For reasons of system simplicity, it is desirable to keep the recording rate constant regardless of track position.

Therefore, magnetic transitions on outer tracks will be more widely separated than those on inner tracks because of their greater circumference. This can lead to a condition known as shouldering, which means that the read back signal does not travel smoothly from one peak to another. Between peaks, the slope assumes a relatively low value, and in severe shouldering, may actually go to zero. With a differentiator technique, these shoulders between peaks would be falsely identified as peaks.

In a real application, the nominal slope need not drop completely to zero for false peak detection to occur. White noise, impulse noise, and cross-talk from other circuits can cause sufficient deterioration to produce false detection.

A prior art method of antishouldering set an amplitude threshold on both sides of zero. This technique required that the amplified read signal traverse both thresholds for a valid peak to be recognized. The difficulty with this technique is in properly selecting the thresholds. The signal amplitude is affected by manufacturing tolerances between heads, by track position, and by recorded patterns. With typical variations, it is difficult to adequately guard against false peak detection with large signals yet not falsely reject valid peaks of small signals.

OBJECTS OF THE INVENTION

It is, therefore, an object of the present invention to eliminate a false peak reading of magnetically recorded information on a rotating magnetic disk file.

It is another object of the present invention to distinguish valid peaks from low slope signals, i.e., shoulders, in magnetically recorded digital signals.

SUMMARY OF THE INVENTION

The present application is utilized in an AC magnetic recording system where information is encoded in the time duration between peaks of a signal. The disclosed invention employs detectors controlled by the signal and a delayed replica of the signal to establish time windows during which valid peaks may be recorded. False peaks subsequent to the valid peak are ignored for a period up to the delay time. When the signal reverses within the delay time, the peak detector is armed to detect a valid peak of the opposite polarity.

DESCRIPTION OF THE DRAWINGS

For a more complete understanding of the invention, as well as other objects and further features thereof, reference may be had to the following detailed description of the invention in conjunction with the drawings wherein.

DETAILED DESCRIPTION OF THE INVENTION

Figure 1:
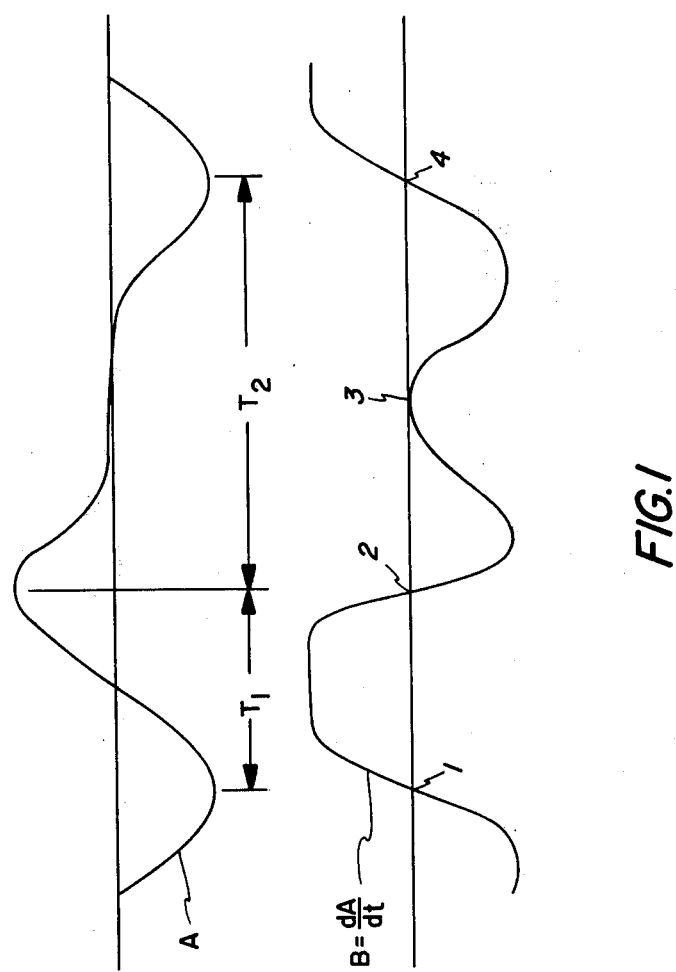
FIG. 1 depicts a typical magnetically recorded signal and its first time derivative.

FIG. 1 illustrates a typical waveform of a signal A detected from recorded digital data on a rotating magnetic disk. The peaks of the waveform represent magnetic flux reversals previously recorded on the disk surface. Information is carried in the relative time duration between peaks and, in most formats, the ratio of the longest time to the shortest time is two. In FIG. 1, time T2 is twice time T1. Typically, the amplitude of signal A varies over a wide range, but the position of the peaks is the most stable parameter. Therefore, peak detection is employed to translate the waveform to digital data. One method of peak detection utilizes an electronic differentiator which converts the waveform to its first derivative, or slope. At a peak, the first derivative, shown as curve B in FIG. 1, will pass through zero. Detecting zero crossings of the differentiator is a well known prior art technique.

As shown in FIG. 1, the slope of waveform A during time T2 may be very low or even zero. Waveform B is the first time derivative of waveform A. Points 1, 2, and 4 are zero crossings that represent valid peaks of waveform A. However, at point 3, the differentiator circuit would produce a false peak indication because of the shouldering during time T2.

Figure 2:
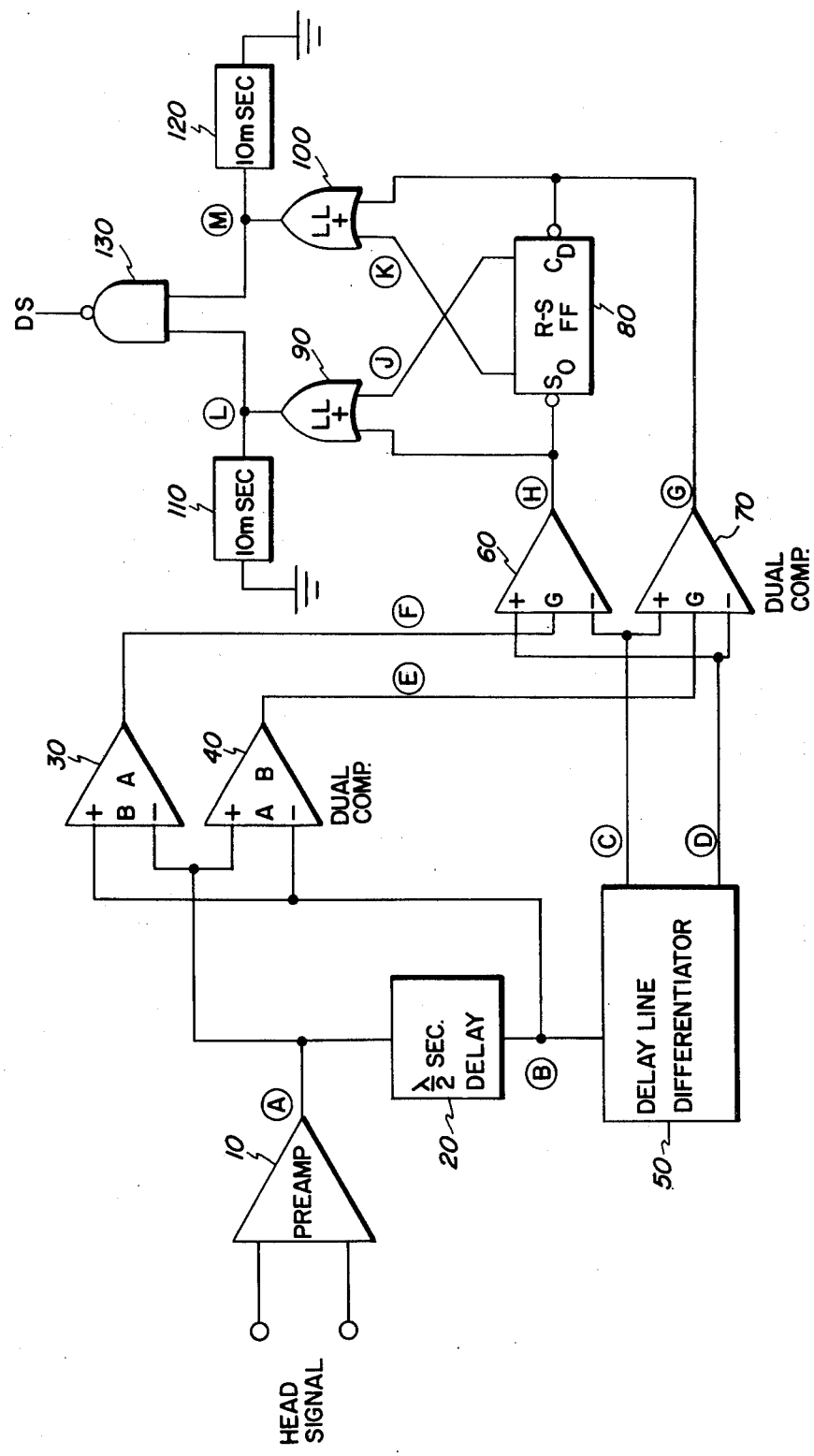
FIG. 2 is a schematic diagram showing the circuit details of the present invention.

The schematic diagram of FIG. 2 illustrates a circuit for discriminating against false peak detection due to shouldering. The magnetic read head would be coupled to preamplifier 10 as shown in FIG 2. Delay circuit 20 delays B, the amplified read back signal A by one half wavelength in time of the highest frequency component. Coupled to the output of preamplifier 10 and delay circuit 20 are dual comparators 30 and 40. The delayed and undelayed signals are compared in these two polarity discriminators to provide an indication of which signal is more positive than the other, signals E and F. A delay line differentiator 50 is coupled to the output of delay circuit 20 which differentiates the delayed signal B to provide complementary outputs C and D. Two further dual comparators 60 and 70 act as two zero crossing detectors to provide a zero crossing indication G and H for each polarity of the input signal. The other inputs to comparators 60 and 70 are coupled to the outputs of comparators 30 and 40.

Thus, comparators 60 and 70 acting as zero crossing detectors, are gated by the polarity discriminators 30 and 40. The positive peak detector (negative going derivating) is enabled when the delayed signal is more positive than the undelayed signal. The negative peak detector (positive going derivative) is enabled when the delayed signal is more negative than the undelayed signal. The outputs G and H of the zero crossing detectors 60 and 70 set and reset a latch circuit, flip-flop 80, which responds only to the first instruction to change state. For example, if the latch circuit is reset and receives a set pulse, it will set. Succeeding set pulses to flip-flop 80 will cause no change in the output. Coupled to the outputs of flip-flop 80 are low level OR gates 90 and 100 utilized to mask any unsymmetrical delays in the output from flip-flop 80. The outputs from the OR gates 90 and 100 are coupled to the input of AND gate 130 and also to shorted to ground ten nanosecond delay lines 110 and 120 to produce a short pulse from an edge, as would a one shot multivibrator. AND gate 130 combines the two sources of pulses into a signal labeled DS which is processed by succeeding circuitry into digital data bits.

Key factors in the above circuit are the use of a time delay approximately equal to one half wavelength of the highest frequency component (equal to the nominal time between the most closely spaced peaks). Another factor is the comparison of the delayed and undelayed signal to determine when the delayed signal reverses polarity. Further is the control of differentiator zero crossing detectors so that only the zero crossing direction that is appropriate to the signal polarity is recognized. Another is the rejection of successive zero crossing indications of the same polarity. Further, the principal relies on the AC nature of the signal and the fundamental frequency component range of two to one, not including harmonic components.

Figure 3:
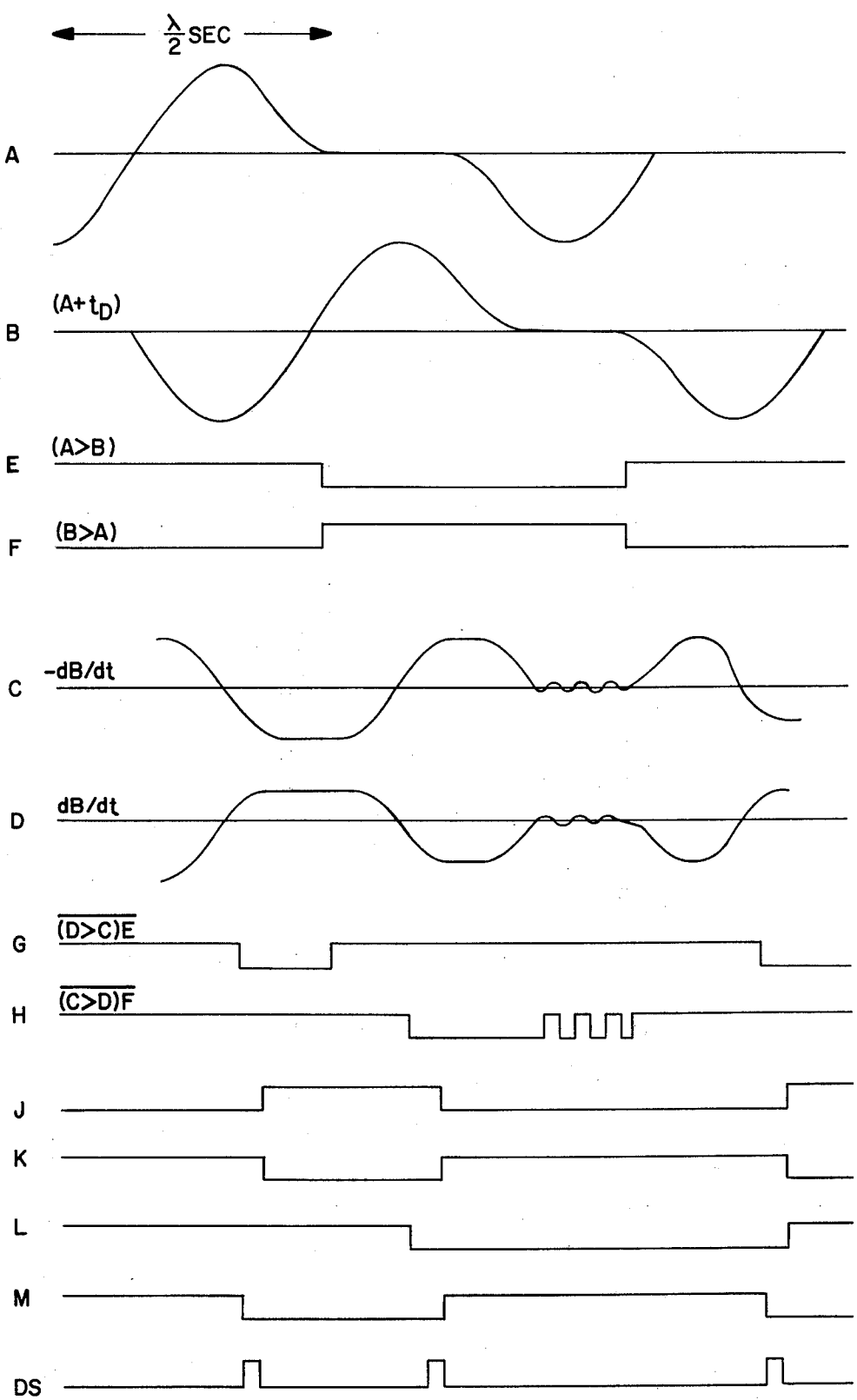
FIG. 3 shows representative waveforms at various points in the circuit shown in FIG. 2.

FIG. 3 shows representative waveforms at the points indicated by letter referring to the signal lines in FIG. 2. Curve A in FIG. 3 shows the output from preamplifier 10 in FIG. 2. The preamplifier 10 is essential because the read back signals are of insufficient magnitude for electronic processing. Curve B in FIG. 3 shows the curve A delayed by the half wave delay time from the output of delay circuit 20. Curve E. shows the output from dual comparator 40 while cruve F shows the output from comparator 30. Thus, it can be seen that comparator 30, curve F, has an output of a single amplitude when B is of greater amplitude than curve A; while E shows a signal of single amplitude when the amplitude of cruve A is greater than that of curve B.

The dual comparators 30 and 40 could be implemented by a single comparator and an inverter circuit. In practice, the delay introduced by an inverter is undesirable. The dual comparators are commercially available with both integrated on a single silicon chip. Since they both experience the same environment of supply voltages and temperature and the same history of diffusion schedules, their delays will be very nearly identical. This factor is more important for dual comparators 60 and 70. Any disparity in delay between the two comparators will introduce a timing error, but the actual delay is not important.

Curves C and D are the outputs from the delay line differentiator 50 of opposite polarity and delineate the differentiated signal of curve B, which is the delayed signal read from the magnetic read head.

As seen in FIG. 2, dual comparators 60 and 70 are coupled to the outputs of the delay line differentiator 50 and the dual comparators 30 and 40. The inputs labeled G on comparators 60 and 70 is a control input which, when low, forces the output to be high regardless of the conditions of the plus and minus inputs. When the G input is high, the state of the comparator output follows the plus and minus inputs. This can be seen with regards to curves G and H in FIG. 3.

Curves J and K are the outputs from flip-flop 80 in FIG. 2. Flip-flop 80 is coupled to outputs G and H from dual comparators 60 and 70. When signal H goes low, output signal K of the latch circuit flip-flop 80 goes high and output J goes low. The reverse occurs when signal G goes low.

Signals J and K from flip-flop 80 are coupled to the inputs of OR gates 90 and 100 in conjunction with signals G and H. Signal L from OR gate 90 and signal M from OR gate 100 are seen in FIG. 3 upon being influenced by the ten nanosecond delay or delay networks 110 and 120. Curves L and M are seen to have falling edges which can be used to energize subsequent circuitry for the generation of the digital signals DS. Such a signal producing network could be a monostable multivibrator, for example.

Thus, while the invention has been described with reference to a specific embodiment, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. A circuit for detecting valid peaks of an input signal comprising:
    means for delaying said input signal to produce a delayed signal,
    means responsive to said input signal and said delayed signal for generating a gating signal,
    means coupled to said delaying means and responsive to said delayed signal for producing a derivative signal,
    means coupled to said means for producing said derivative signal and said means for generating a gating signal and to gate said derivative signal, and
    flip-flop circuit means coupled to said gate means and responsive thereto to generate output signals indicative of the presence of positive and negative peaks in said input signals.

2. A circuit as set forth in claim 1, further including:
    means coupled to the outputs of said flip-flop circuit means and said gate means for generating output digital signals representative of said valid peaks of said input signal.

3. A circuit as set forth in claim 2 wherein said means for generating said output digital signals comprises:
    low level OR gate means for masking any unsymmetrical delays in the output signals from said flip-flop circuit means,
    delay line means coupled to the output of said low level OR gate means for producing signals with discrete edges, and
    AND gate means coupled to said delay line means and said low level OR gate means for generating said output digital signals.

4. In a magnetic disk recording system, a circuit for eliminating false peak readings in the read back signal comprising:
    delay means for delaying said read back signal a predetermined amount in relation to the wavelength of the highest frequency component in said read back signal,
    comparing means responsive to the delayed signal and said read back signal to provide an indication of which of said signals is more positive than the other, differentiator means responsive to said delayed signal to provide complementary differentiated signals, zero crossing detector means coupled to said differentiator means and said comparing means to gate said complementary differentiated signals in response to said signals from said comparing means, latch circuit means coupled to said zero crossing detector means which is set and reset in accordance with the zero crossing of said complementary differentiated signals detected by said zero crossing detector means, and means coupled to said latch circuit means for generating a peak indicating pulse whenever said latch circuit means changes state, the peak indicating pulses being representative of the true digital signals recorded on said magnetic disk recording system.

5. The circuit as set forth in claim 4 wherein said delay means delays said read back signal by one half wavelength in time of said highest frequency component.

6. The circuit as set forth in claim 4 wherein said comparing means comprises a pair of polarity discriminators.

7. The circuit as set forth in claim 4 wherein said zero crossing detector means comprises a pair of dual comparators.

8. The circuit as set forth in claim 4 wherein said latch circuit means comprises a flip-flop circuit which responds only to the first instruction to change its state.

9. The circuit as set forth in claim 4 wherein said means for generating a peak indicating pulse comprises:

delay line means for producing signals with discrete edges, and

AND gate means coupled to said delay line means for generating said representative true digital signals.

10. The circuit as set forth in claim 9 further including low level OR gate means coupled to the input of said AND gate means and the outputs from said latch circuit means and said zero crossing detector means for masking any unsymmetrical delays in the output signals from said latch circuit means.

* * * * *